US008785854B2

(12) United States Patent
Dupont et al.

(10) Patent No.: US 8,785,854 B2
(45) Date of Patent: Jul. 22, 2014

(54) MEASUREMENT SYSTEM AND IMAGER COMPRISING SUCH A SYSTEM

(75) Inventors: Bertrand Dupont, Gargas (FR); Michael Tchagaspanian, Saint Ismier (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 222 days.

(21) Appl. No.: 13/325,498

(22) Filed: Dec. 14, 2011

(65) Prior Publication Data
US 2012/0168624 A1 Jul. 5, 2012

(30) Foreign Application Priority Data

Dec. 22, 2010 (FR) .................................... 10 61041

(51) Int. Cl.
G01J 5/00 (2006.01)
G02F 1/01 (2006.01)
H01L 27/00 (2006.01)
(52) U.S. Cl.
USPC ..................... 250/338.1; 250/330; 250/338.3; 250/208.1
(58) Field of Classification Search
CPC ................ G01J 5/20; G01J 5/02; G01J 5/34; G01J 5/10; H04N 5/33; H04N 5/332; H04N 5/378; H04N 5/374; H01L 27/14609; H01L 27/14643
USPC .................................... 250/338.1, 330, 338.3
See application file for complete search history.

(56) References Cited

U.S. PATENT DOCUMENTS 7,088,160 B2 *   8/2006  Harms et al. ................... 327/175
8,039,797 B2 * 10/2011  Hannebauer ............... 250/338.1
2003/0160171 A1   8/2003  Parrish et al.
2004/0200961 A1  10/2004  Parrish et al.
2007/0236164 A1 * 10/2007  Xia et al. ....................... 318/632
2009/0008555 A1 *  1/2009  Dupont et al. ............. 250/338.1
2009/0008556 A1 *  1/2009  Dupont et al. ............. 250/338.1
2010/0181485 A1   7/2010  Legras

FOREIGN PATENT DOCUMENTS

EP          2 208 976 A1      7/2010

OTHER PUBLICATIONS

French Preliminary Search Report issued Aug. 17, 2011, in French 1061041, filed Dec. 22, 2010 (with English Translation of Categories of Cited Documents).

* cited by examiner

*Primary Examiner* — David Porta
*Assistant Examiner* — Mindy Vu
(74) *Attorney, Agent, or Firm* — Oblon, Spivak, McClelland, Maier & Neustadt, L.L.P.

(57) ABSTRACT

A measurement system including a reference resistive sensor traversed by a reference current, with a reference arm having a reference resistance and being traversed by the reference current in order to produce a reference voltage between its ends, at least one measurement resistive sensor traversed by a measurement current that depends on a measurement taken by the measurement resistive sensor, a measurement mirror arm traversed by a current, and a device for measuring the difference between the measurement current and the current traversing the measurement mirror arm. The resistance of the measurement mirror arm of each measurement resistive sensor is equal to the reference resistance and the measurement system further includes a device for applying, to each measurement mirror arm, the reference voltage. The device for applying the reference voltage being designed to the isolated to a current of the measurement mirror arm when the reference voltage is applied.

10 Claims, 3 Drawing Sheets

MEASUREMENT SYSTEM AND IMAGER COMPRISING SUCH A SYSTEM

BACKGROUND (1) Field

This invention relates to measurement systems using resistive sensors, which are sensors whose resistance varies according to the physical quantity that they measure.

It particularly applies to the field of imagers, where resistive sensors are bolometers, such as infrared bolometers whose resistance varies according to the infrared radiation received, or bolometers that are sensitive to other frequencies of electromagnetic radiation, such as terahertz frequencies.

In the remainder of the description and in the claims, the equality of two electrical values (voltage, current, resistance, etc.) means that these two values are equal with only a few technological dispersions.

Moreover, terms like "high", "low", "row", and "column" will be used in reference to the orientation of the drawings for clarity in describing items. They are not intended to be limited specifically to the actual orientation and geometric layout of these elements.

(2) Description of the Related Art

An infrared imager provides an image in the form of a pixel array. In uncooled infrared imaging, bolometers are used to capture the infrared flux coming from a scene. There is usually one bolometer per pixel in order to produce an infrared image of the scene, each bolometer being integrated into a respective bolometric cell. Therefore, the infrared imager comprises an array of bolometric cells.

A bolometer is a resistive sensor whose resistance varies with the temperature and therefore with the infrared flux coming from the scene. To read the resistance value of the bolometer, which corresponds to an infrared flux, it is known to apply a voltage and to measure the current passing through the bolometer.

However, the variation in current related to a variation in infrared flux of 50 Kelvin is around a percent. It is therefore necessary to remove most of the measured current in order to have a current to integrate that is as small as possible corresponding to the resistance variations of the sensitive bolometer in response to the infrared flux from the scene. This removal of current is called "baselining".

For this, it is known to use reference bolometers that are subjected to little or none of the effects of the infrared flux coming from the scene. These reference bolometers are either "column footing", meaning that there is one reference bolometer common to all of the bolometers in a column, or "row heading", meaning that there are one or more reference bolometers common to all of the bolometers in a row.

Thus, with reference to FIG. 1, in this second case, it is known to use an infrared imager comprising:

a resistive sensor such as a reference bolometer 2, means 4, 6 for applying a voltage to the reference bolometer 2, such that the reference bolometer is traversed by a reference current, a reference arm 8 with a reference resistance 10 and connected such that it is traversed by the reference current to produce a reference voltage between its ends, at least one resistive sensor, such as a measurement bolometer 12, and for each measurement bolometer 12:

means 4, 16 for applying a voltage to the measurement bolometer, such that the measurement bolometer is traversed by a measurement current that depends on the exposure of the measurement bolometer to infrared radiation, a mirror measurement arm 18 with a resistance 20 and intended to be traversed by a current that is equal to the reference current, means 22 for measuring the difference in current between the measurement current and the current traversing the mirror measurement arm 18.

In such an infrared imager, the means for applying a voltage to the reference bolometers and measurement bolometers comprise, for each bolometer, on the one hand, a power supply line 4 that polarizes a bolometer terminal and, on the other hand, a transistor 6 whose power source polarizes the other bolometer terminal.

Moreover, transistors 24, 26 in a mirror current arrangement are used to replicate the reference current in each of the mirror measurement arms of the given row in the array.

In such an arrangement, a first transistor 24 is diode-connected, which involves that it adjusts its gate potential to allow the arriving current that arrives to its drain to flow. In each measurement arm, the gate of a second transistor 26, which is not diode-connected, is connected to the gate of the first transistor 24 such that said second transistor 26 copies the current traversing the first transistor 24 between its source and its drain.

This solution provides two advantages, namely a significant rejection of power supply noise and low temperature drift, given that the reference circuit and the measurement circuits are very similar in terms of the components they use.

However, the current trend is to lower power supply voltages, which requires also reducing the values of bolometric resistances in order to maintain acceptable levels of performance.

However, using such bolometers leads to an increase in the reference current. This results in a higher gate potential of the transistor 24 and therefore also of the drain of the transistor 6 for polarizing the reference bolometer.

However, this polarization transistor 6 must operate in saturated mode, which is not possible if the drain potential is too high.

Therefore, the known infrared imager is incompatible with the current trend of lowering power supply voltages.

Moreover, the reduction in the values of bolometric resistances significantly limits the readout electronics such that, in order to keep the noise from this readout electronics insignificant relative to the bolometric cells, it becomes necessary to use large transistors with a high capacitance between their gate and their substrate. This is added to the fact that array formats always tend to grow larger such that the combined capacitance of the measurement transistors becomes very high and difficult to charge in a time that is compatible with the constraints of video rate.

Therefore, the known infrared imager is incompatible with the current trend of lowering power supply voltages and increasing the size of the array of bolometric cells.

It may therefore be desirable to provide a measurement system that can overcome at least some of the above problems and constraints.

BRIEF SUMMARY

The invention therefore relates to a measurement system comprising:

a reference resistive sensor, means for applying a voltage to the reference resistive sensor, such that the reference resistive sensor is traversed by a reference current, a reference arm comprising a reference resistance and connected to the reference resistive sensor so as to be traversed by the reference current at least one measurement resistive sensor, and, for each measurement resistive sensor:

means for applying a voltage to the measurement resistive sensor, such that the measurement resistive sensor is traversed by a measurement current that depends on the exposure of the measurement bolometer to infrared radiation, a mirror measurement arm comprising a resistance and intended to be traversed by a current that is equal to the reference current, a measurement transistor with a gate and a source, said source being connected to one end of the measurement mirror arm, means for measuring the difference in current between the measurement current and the current traversing the mirror measurement arm, the measurement system comprising:

a reference mirror arm comprising a resistance, a reference transistor with a gate, a drain, and a source, said source being connected to one end of the reference mirror arm, an operational amplifier with one positive input connected to one end of the reference arm, one negative input connected to the source of the reference transistor, and one output connected to the gate of the reference transistor, and the gate of each measurement transistor is connected to the output of the operational amplifier.

Therefore, thanks to the invention, the measurement system no longer needs to include transistors in a current mirror arrangement such that there are no longer problems related to the drain potential of the transistor for polarizing the reference resistive sensor and to charging the mirror transistors.

Also optionally, the measurement system further comprises an electrical ground that connects the other ends of the reference arms and reference mirror arms.

Also optionally, the measurement system further comprises, for each measurement mirror arm, an electrical ground that is connected to the other end of the measurement mirror arm.

Also optionally:

the reference mirror arm is one of the measurement mirror arms, and the reference transistor is the measurement transistor connected to the reference mirror arm.

Also optionally:

the reference mirror arm is different from the measurement mirror arms, and the reference transistor is different from the measurement transistors.

Also optionally:

the means for applying a voltage to the reference resistive sensor comprises a first transistor with a source connected to a reference resistive sensor terminal and a drain, and the measurement system further comprises means for polarizing the drain of the first transistor to a set potential.

Also optionally, the means for polarizing the drain of the first resistive sensor comprise:

a second transistor with a gate, a drain, and a source, said source being connected to the drain of the first transistor, and an operational amplifier with a positive input intended to receive the set potential, a negative input connected to the source of the second transistor, and an output connected to the gate of the second transistor.

Also optionally, the resistance of the measurement mirror arm of each measurement resistive sensor has a value equal to that of the reference resistance.

Also optionally, the resistance of the reference mirror arm has a value equal to that of the reference resistance.

The invention also relates to an imager comprising a measurement system according to the invention, in which the resistive sensors are bolometers.

BRIEF DESCRIPTION OF THE DRAWINGS

The invention will be better understood using the following description, given purely as an example and referring to the accompanying drawings, in which.

DETAILED DESCRIPTION

Figure 2:
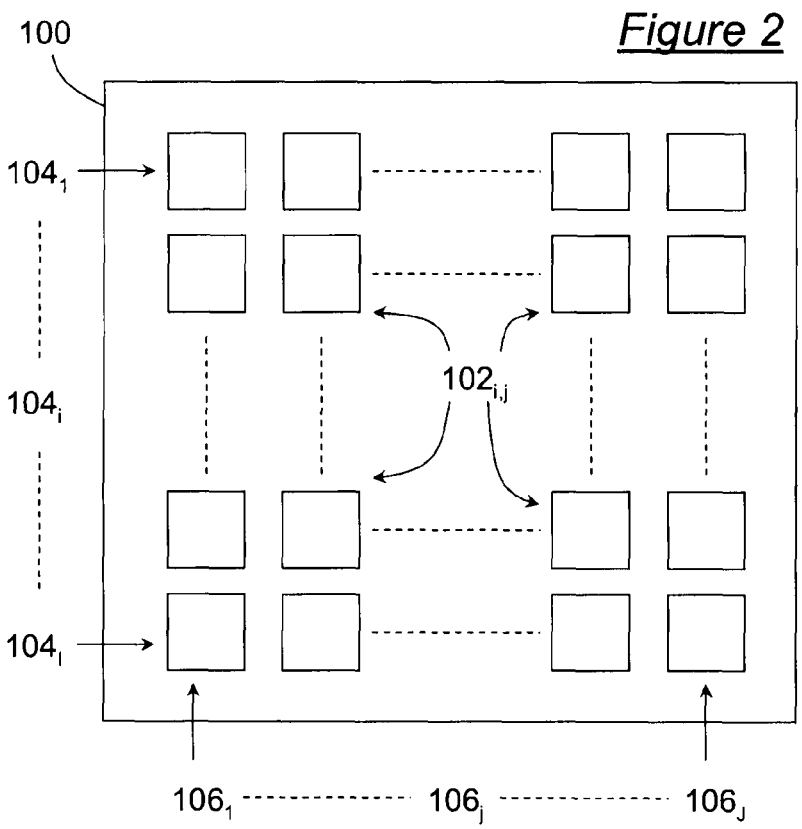
FIG. 2 is a general diagram of an infrared imager implementing the invention.

With reference to FIG. 2, an infrared imager 100 comprises bolometric cells $102_{i,j}$ arranged in an arrow of rows $104_i$ and columns $106_j$.

Figure 3:
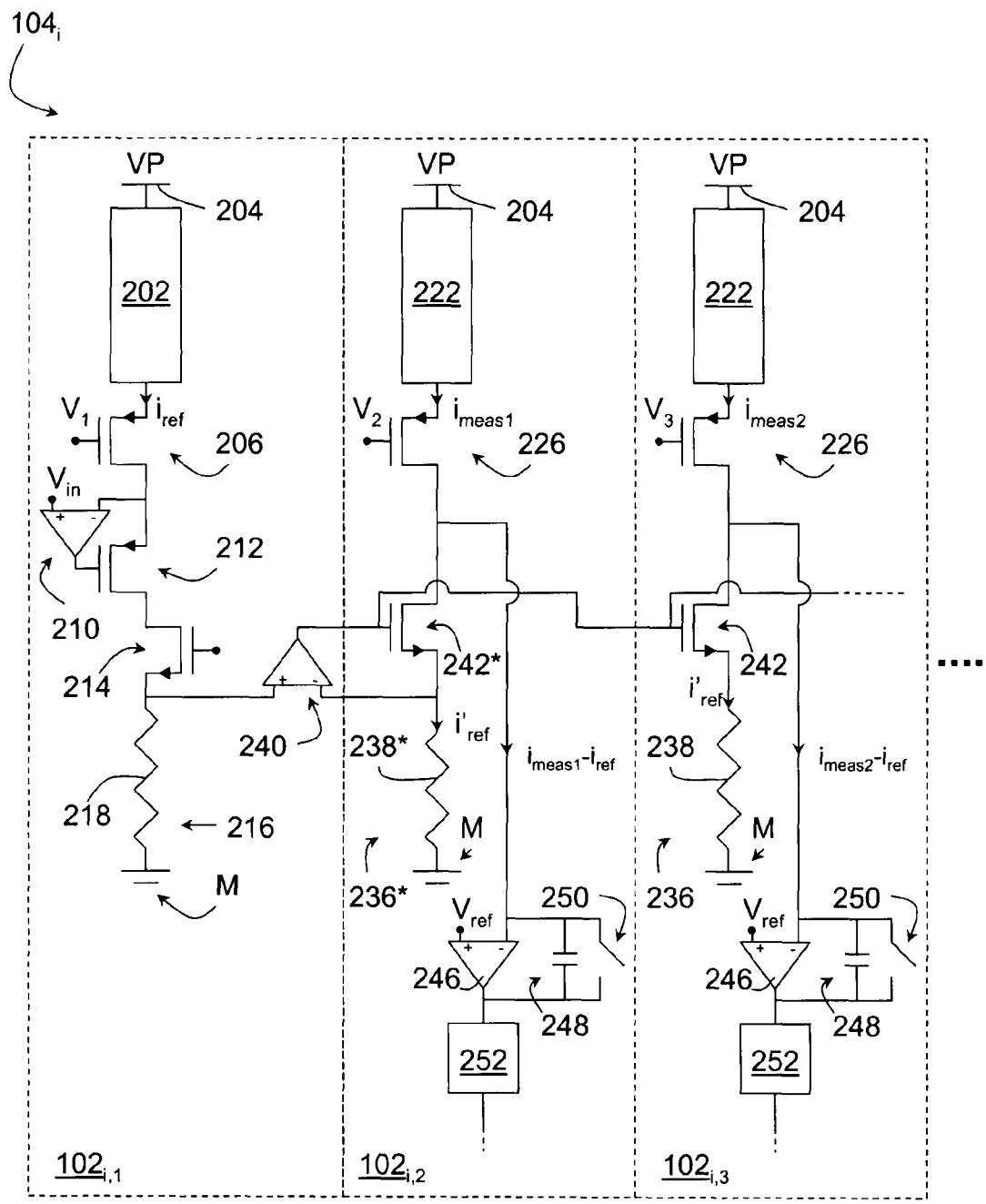
FIG. 3 is a circuit diagram of a part of a row of cells of the infrared imager in FIG. 2 according to a first embodiment of the invention.

With reference to FIG. 3, each row $104_i$ comprises a reference cell $102_{i,1}$ followed by multiple measurement cells $102_{i,2}$, $102_{i,3}$.

The reference cell $102_{i,1}$ comprises a reference bolometer 202, designed to be insensitive to infrared radiation received by the infrared imager, at least less sensitive than the measurement bolometers that will be introduced later. The reference bolometer 202 is, for example, a thermalized bolometer or even a bolometer covered by a screen.

The reference cell $102_{i,1}$ further comprises means 204, 206 for applying a voltage to the reference bolometer 202, such that the reference bolometer is traversed by a reference current $i_{ref}$.

In the described example, the means 204, 206 first comprise a power supply line 204 connected to an upper terminal of the reference bolometer 202. The power supply line 204 is designed to polarize this upper terminal with a predetermined potential VP, such as 3.3 or 5 volts. The means 204, 206 further comprise means for polarizing a lower terminal of the reference bolometer 202. In the described example, the means of polarization comprise a p-MOS transistor 206 with a gate, a drain, and a source, the source being connected to the lower terminal of the reference bolometer 202. The means of polarization further comprise means (not shown) for polarizing the gate of the p-MOS transistor 206 to a potential $V_1$. Therefore, it is possible to set the potential of the source of the p-MOS transistor 206, and therefore the lower terminal of the reference bolometer 202, based on the potential $V_1$.

However, this setting is possible only if the potential of the drain of the p-MOS transistor 206 is stabilized. Otherwise, the source potential is derived based on the drain potential. This phenomenon is sometimes called the "Early effect".

Therefore, the reference cell $102_{i,1}$ further comprises means 210, 212 for polarizing the drain of the p-MOS transistor 206.

These means of polarization 210, 212 first comprise an operational amplifier 210 with an output, a positive input, and a negative input, the negative input being connected to the drain of the p-MOS transistor 206. The means of polarization 210, 212 also comprise a p-MOS transistor 212 with a drain, a gate connected to the output of the operational amplifier 210, and a source connected to the negative terminal of the operational amplifier 210. Therefore, there is a feedback loop between the negative input and the output of the operational amplifier 210 such that, during operation, the potential of the negative input of the operational amplifier 210, and thus of the source of the p-MOS transistor 212, quickly becomes equal to the potential of the positive terminal of the operational amplifier 210. Moreover, the presence of the p-MOS transistor 212 in the feedback loop isolates the current that flows between the source and the drain of the p-MOS transistor 212 from the current generated at the output of the operational amplifier 210.

In the remainder of the description, such an arrangement of an operational amplifier and a transistor will be called a "non-disruptive polarizer arrangement" because it makes it possible to polarize the source of the transistor to the potential of the positive input of the operational amplifier without disrupting the current flowing between the source and the drain of the transistor.

The means of polarization 210, 212 further comprise means (not shown) for polarizing the positive input of the operational amplifier 210 to a potential $V_{in}$, so as to polarize the drain of the p-MOS 206 to this same potential $V_{in}$.

The reference cell $102_{i,1}$ further comprises a switch 214 that can be used in another form of baselining than what is described as part of this invention. In the described example, this switch consists of an n-MOS transistor 214.

The reference cell $102_{i,1}$ further comprises a reference arm 216 with a predetermined resistance value R. As such, the reference arm 216 comprises a resistance 218 of value R. The reference arm 216 is connected, at an upper end, to the switch 214, and at a lower end, to an electrical ground M of the infrared imager. Therefore, the reference arm 216 is traversed by the reference current provided by the reference bolometer 202, such that the upper end of the reference arm 216 has a voltage $V_R$ equal to $R \times i_{ref}$, based on the reference current $i_{ref}$, between its ends.

Each measurement cell $102_{i,2}$, $102_{i,3}$ comprises a measurement bolometer 222 and means 204, 206 for applying a voltage to the measurement bolometer 222, such that the measurement bolometer is traversed by a measurement current $i_{meas1}$, $i_{meas2}$. In the described example, the means 204, 226 are identical to the means 204, 206 and thus comprise the power supply line 204 and means 226 for polarizing (a p-MOS transistor in the described example) the lower terminal of the measurement bolometer 222. Therefore, it is possible to set the potential of the lower terminal of the measurement bolometer 222, based on potentials $V_2$, $V_3$ applied to the drain of the given p-MOS transistor.

Every measurement cell $102_{i,2}$, $102_{i,3}$ further comprises a measurement mirror arm 236 (marked as 236* for the first measurement cell $102_{i,2}$) intended to be traversed by a current $i'_{ref}$ equal to the reference current $i_{ref}$ as will be explained later. The measurement mirror arm 236*, 236 has the same resistance 238*, 238 as the predetermined resistance R.

So that the reference current $i_{ref}$ traverses every measurement mirror arm 236*, 236, the infrared imager comprises means 240, 236*, 238*, 242*, 242, M for applying the reference voltage at every measurement mirror arm 236*, 236.

In the described example, the means for applying the reference voltage 240, 236*, 238*, 242*, 242, M comprise an operational amplifier 240 and an n-MOS transistor 242* arranged as a "non-disruptive polarizer", with the positive input of the operational amplifier 240 connected to the upper end of the reference arm 216, the drain of the n-MOS transistor N-MOS 242* connected to the drain of the p-MOS transistor 226 of the first measurement cell $102_{i,2}$ and the source of the n-MOS transistor 242* connected to the upper end of the measurement mirror arm 236*. Therefore, the upper end of the measurement mirror arm 236* is polarized to the potential of the upper end of the reference arm 216.

The means for applying the reference voltage 240, 236*, 238*, 242*, 242. M further comprise the measurement mirror arm 236*, which acts as a reference mirror arm to allow the feedback to be implemented.

Moreover, the means for applying the reference voltage 240, 236*, 238*, 242*, 242, M also comprise the electrical ground M connected to the lower end of the measurement mirror arm 236* and keeping this end at the same potential as the potential of the lower end of the reference arm 216.

Therefore, since the measurement mirror arm 236* has the same resistance R as the reference arm 216, a current of the same value traverses them. Therefore, $i_{ref}$ is in the measurement mirror arm 236 of the first measurement cell $102_{i,2}$.

In the described example, the means for applying the reference voltage 240, 236*, 238*, 242*, 242, M further comprise, for each measurement cell $102_{i,3}$ that follows the first one, an n-MOS transistor 242 with a gate connected to the output of the operational amplifier 240, a source connected to the upper end of the measurement mirror arm 236 and a drain connected to the drain of the p-MOS transistor 226. The n-MOS transistor(s) 242 are identical to the n-MOS transistor 242*. Therefore, since the same gate potential is applied and since they further have the same drain potential $V_{ref}$ required by the amplifier 246 that will be described later, the same source potential appears at the upper end of the measurement mirror arm 236. Also, since the measurement mirror arm 236 has its lower end connected to the electrical ground M, the reference voltage is applied between the ends of the measurement mirror arm 236. Finally, since the measurement mirror arm 236 has the reference resistance, it is traversed by a current $i'_{ref}$ equal to the reference current $i_{ref}$.

Each measurement cell $102_{i,2}$, $102_{i,3}$ further comprises measurement means 246, 248, 250 connected to the high end of the measurement mirror arm 236 and designed to measure the difference between the measurement current $i_{meas1}$, $i_{meas2}$ and the reference current $i_{ref}$ traversing the measurement mirror arm 236.

In the described example, the measurement means 246, 248, 250 comprise an operational amplifier 246 arranged as an integrator. More specifically, the operational amplifier 246 has a positive input connected to a predetermined potential $V_{ref}$, such as VP/2, a negative input connected to each of the drains of the p-MOS 226, and the n-MOS 242* or 242, depending on the given measurement cell. The measurement means 246, 248, 250 further comprise a capacitance 248 connected to the output and the negative input of the operational amplifier 246, thereby forming a capacitive feedback loop, such that the output of the operational amplifier 246 has, during operation, a potential that is proportional to the integral of the current passing through the capacitance 248, meaning the difference between the measurement current $i_{meas1}$, $i_{meas2}$ and the reference current $i_{ref}$. The measurement means 246, 248, 250 further comprise a switch 250 arranged in parallel to the capacitance 248, making it possible to reset the measurement by closing it.

Additionally, due to the properties of operational amplifiers, it will be noted that the potential of the negative input tends to be equal to the potential of the positive input, meaning $V_{ref}$. Therefore, the potential of the drain of the p-MOS transistor 226 is stabilized at the potential $V_{ref}$ and it is possible to set the potential of the source of the p-MOS transistor 226 based on the gate potential $V_2$, $V_3$.

Each measurement cell $102_{i,2}$, $102_{i,3}$ further comprises a sampler 252 connected to the output of the measurement means 246 and designed to sample the provided measurement.

Samplers 252 in the same column of measurement cells are all connected to one or more column multiplexers (not shown, but symbolized by the dotted line) to continue processing and/or using sampled measurement signals.

Figure 1:
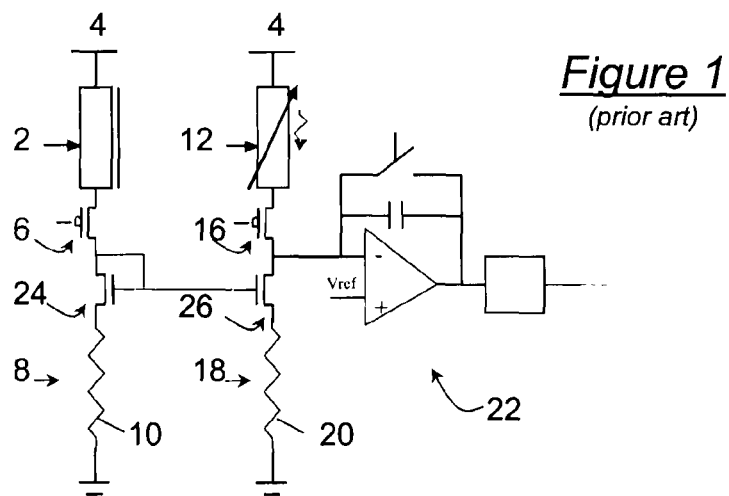
FIG. 1 is a circuit diagram for an infrared imager from the prior art, described above.

The operation of the infrared imager in FIG. 1 will now be described.

The switch 214 is first switched off to allow for the implementation of the baselining.

The potential $V_{ref}$ is applied to the operational amplifiers 246, and the potential $V_{in}$ is applied to the negative input of the operational amplifier 210 and thus also to the drain of the p-MOS transistor 206. During normal operation, the potential $V_{in}$ is chosen equal to the potential $V_{ref}$. However, for testing phases, it may be advantageous to use a potential $V_{in}$ that is different than the potential $V_{ref}$.

The reference and measurement bolometers are switched on by applying the potentials $V_1$, $V_2$, and $V_3$. In an ideal circuit, the potentials $V_1$, $V_2$, and $V_3$ should be equal. However, in practice, it may be interesting to set them individually to different values.

To read a row a measurement cells, the switches 250 for that row are switched from off to on to initialize the current measurement.

The reference current $i_{ref}$ traverses the reference arm 216 and polarizes the upper end of it to the potential $V_R = R \times i_{ref}$.

Due to its feedback loop, the operational amplifier 240 changes its output potential until its positive and negative inputs are at the same potential.

Since the gates of the transistors 242*, 242 for each measurement cell $102_{i,2}$, $102_{i,3}$ are connected to the output of the operational amplifier 240, the potential $V_R = R \times i_{ref}$ is applied to the upper terminal for each measurement mirror arm 236*, 236.

Since each measurement mirror arm 236*, 236 has the same resistance R as the reference arm 216, a current $i_{ref}$ is generated in each of them, which baselines the measurement current for the cells in the column being read, meaning that the measurement means 246, 248, 250 receive the measurement current less the reference current.

This current difference is stored up in the capacitance 248, to then be read by the sampler 252.

As explained in the introduction, the combined capacitance between the gates and the substrates of the measurement transistors 242*, 242 can become very high. It is therefore necessary to size the operational amplifier 240 accordingly.

Moreover, it was noted that the measurement of the first bolometric cell $102_{i,2}$ could be disrupted by the fact that, at the start of its reading, a considerable amount of time passes before the operational amplifier 240 supplies the output potential that allows the positive and negative inputs to be at the same potential. During this time, a non-zero charging current is flowing towards the negative input of the operational amplifier 240, therefore disrupting the current $i'_{ref}$ flowing in the measurement mirror arm 236*. It may therefore be desirable to not use this arm 236* for taking measurements.

Figure 4:
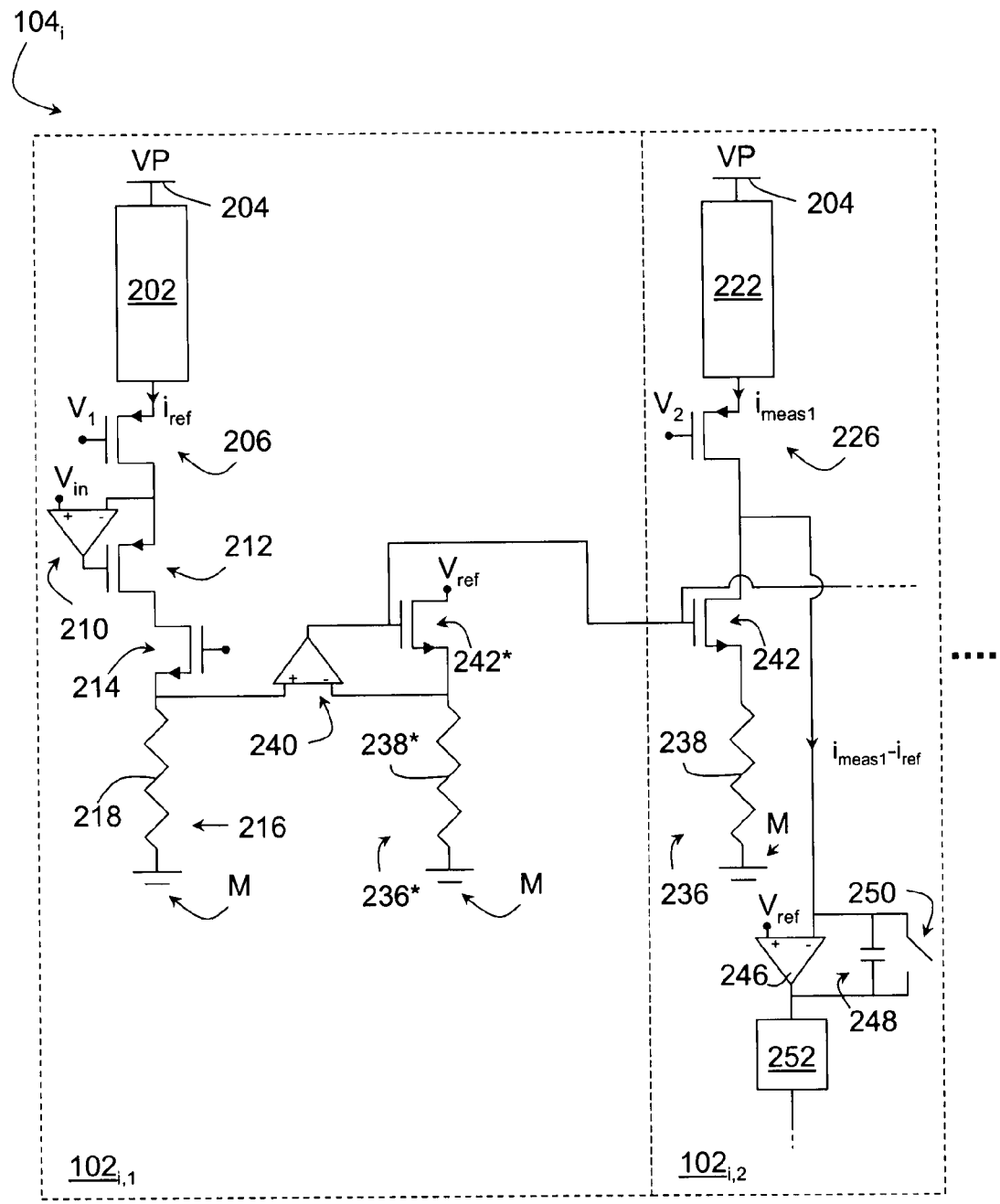
FIG. 4 is a circuit diagram of a part of a row of cells of the infrared imager in FIG. 2 according to a second embodiment of the invention.

Therefore, with reference to FIG. 4, the reference cell includes the measurement mirror arm 236*, which is now a reference mirror arm for copying the reference potential.

In this embodiment, the drain of the transistor 242* is directly connected to the potential $V_{ref}$ and the current measurement elements 246, 248, 250, 252 are removed.

It is clear that an infrared imager, such as one of those described above, does not use transistors in a current mirror arrangement.

Also note that the invention is not limited to the embodiments described above. As is known to those skilled in the art, there are various modifications that can be made to the embodiments described above, with respect to the instruction that has been disclosed.

Specifically, the n-type and p-type transistors could be reversed for all of the described transistors.

Moreover, even though an infrared imager has been given as an example of implementing the invention, the invention is not limited to infrared imagers, but rather extends to imagers in other areas of frequency, such as terahertz frequencies and even more generally to any other type of measurement system that uses resistive sensors, such as NTC (Negative Temperature Coefficient) sensors or LDR (Light Dependent Resistor) sensors.

More generally, in the following claims, the terms used should not be interpreted as limiting the claims to the embodiments presented in this description, but should be interpreted to include all of the equivalents that the claims intend to cover by their formulation and whose projection is within reach of those skilled in the art by applying their general knowledge to the instruction that has just been disclosed.

The invention claimed is:

1. A measurement system comprising:
   a reference resistive sensor,
   means for applying a voltage to the reference resistive sensor, such that the reference resistive sensor is traversed by a reference current,
   a reference arm comprising a reference resistance and connected to the reference resistive sensor so as to be traversed by the reference current,
   at least one measurement resistive sensor,
   and, for each measurement resistive sensor:
   means for applying a voltage to the measurement resistive sensor, such that the measurement resistive sensor is traversed by a measurement current that depends on the measurement taken by the measurement resistive sensor,
   a measurement mirror arm comprising a resistance and intended to be traversed by a current that is equal to the reference current,
   a measurement transistor with a gate and a source, said source being connected to one end of the measurement mirror arm,
   means for measuring the difference in current between the measurement current and the current traversing the measurement mirror arm,
   the measurement system further comprising being characterized in that it comprises:
   a reference mirror arm comprising a resistance,
   a reference transistor with a gate, a drain, and a source, said source being connected to one end of the reference mirror arm,
   an operational amplifier with one positive input connected to one end of the reference arm, one negative input connected to the source of the reference transistor, and one output connected to the gate of the reference transistor, and in that the gate of each measurement transistor is connected to the output of the operational amplifier.

2. A measurement system according to claim 1, further comprising an electrical ground that connects to the other end of each of the reference arm and the reference mirror arm.

3. A measurement system according to claim 1 or 2, further comprising, for each measurement mirror arm, an electrical ground connected to the other end of the measurement mirror arm.

4. A measurement system according to claim 1, in which:
the reference mirror arm is one of the measurement mirror arms, and
the reference transistor is the measurement transistor connected to the reference mirror arm.

5. A measurement system according to claim 1, in which:
the reference mirror arm is different from each measurement mirror arm, and
the reference transistor is different from each measurement transistor.

6. A measurement system according to claim 1,
in which the means for applying a voltage to the reference resistive sensor comprise a first transistor with a source connected to a reference resistive sensor terminal and a drain, and
further comprising means for polarizing the drain of the first transistor to a set potential.

7. A measurement system according to claim 6, in which the means for polarizing the drain of the first transistor comprise:
a second transistor with a gate, a drain, and a source, said source being connected to the drain of the first transistor, and
an operational amplifier with a positive input intended to receive the set potential, a negative input connected to the source of the second transistor, and an output connected to the gate of the second transistor.

8. A measurement system according to claim 1, in which the resistance of the measurement mirror arm of each measurement resistive sensor has a value equal to that of the reference resistance.

9. A measurement system according to claim 1, in which the resistance of the reference mirror arm has a value equal to that of the reference resistance.

10. An imager comprising a measurement system according to claim 1, in which the resistive sensors are bolometers.

* * * * *